(12) United States Patent
Allphin

(10) Patent No.: US 8,868,315 B2
(45) Date of Patent: Oct. 21, 2014

(54) SYSTEMS AND METHODS FOR ESTIMATING A TEMPERATURE CALIBRATION

(75) Inventor: Devin Michael Allphin, Redondo Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 993 days.

(21) Appl. No.: 12/958,630

(22) Filed: Dec. 2, 2010

(65) Prior Publication Data

US 2012/0143461 A1 Jun. 7, 2012

(51) Int. Cl.
| | |
|---|---|
| G06F 19/00 | (2011.01) |
| G06G 7/70 | (2006.01) |
| F01N 3/30 | (2006.01) |
| F01N 11/00 | (2006.01) |
| F02D 41/24 | (2006.01) |
| F01N 3/22 | (2006.01) |
| F02D 41/02 | (2006.01) |

(52) U.S. Cl.
CPC ............... *F01N 3/306* (2013.01); *Y02T 10/20* (2013.01); *F01N 11/005* (2013.01); *F01N 3/225* (2013.01); *F01N 2900/0422* (2013.01); *Y02T 10/47* (2013.01); *F02D 2200/501* (2013.01); *F01N 2900/0412* (2013.01); *F01N 2550/14* (2013.01); *F01N 2900/10* (2013.01); *F02D 41/2432* (2013.01); *F01N 2900/0416* (2013.01); *F01N 2900/08* (2013.01); *F02D 41/024* (2013.01)
USPC ............................................. 701/102; 60/289

(58) Field of Classification Search
CPC .................. F02D 41/0275; F02D 41/1446
USPC ............... 60/274, 277, 289, 290; 73/114.69, 73/114.71, 114.75; 123/179.1, 563, 564, 123/674; 701/102, 113, 114
See application file for complete search history.

(56) References Cited

U.S. PATENT DOCUMENTS

| | | | |
|---|---|---|---|
| 5,675,968 A * | 10/1997 | Katashiba et al. | 60/276 |
| 6,091,324 A | 7/2000 | Arsenault et al. | |
| 6,128,948 A | 10/2000 | Shi et al. | |
| 6,192,678 B1 * | 2/2001 | Tachibana | 60/289 |
| 6,208,917 B1 | 3/2001 | McKissick, Jr. et al. | |
| 6,687,601 B2 | 2/2004 | Bale et al. | |
| 6,714,854 B2 | 3/2004 | Linenberg et al. | |
| 6,931,865 B1 | 8/2005 | VanGilder et al. | |
| 7,120,535 B2 | 10/2006 | Rahman et al. | |
| 7,429,128 B2 | 9/2008 | Izumiura et al. | |
| 7,463,960 B2 | 12/2008 | Thiel et al. | |
| 7,464,681 B2 | 12/2008 | Rockwell et al. | |
| 8,429,902 B2 * | 4/2013 | Kondou | 60/289 |
| 2002/0099482 A1 | 7/2002 | Reese, II et al. | |
| 2008/0120967 A1 * | 5/2008 | Tracey | 60/289 |
| 2009/0182489 A1 * | 7/2009 | Yang et al. | 701/113 |
| 2012/0285142 A1 * | 11/2012 | Shibata et al. | 60/274 |

* cited by examiner

*Primary Examiner* — Mahmoud Gimie
*Assistant Examiner* — Sizo Vilakazi
(74) *Attorney, Agent, or Firm* — Dinsmore & Shohl LLP

(57) ABSTRACT

Systems and methods for estimating a temperature calibration are described. One embodiment of a method includes determining, by a computing device, a current speed of the vehicle and determining a dynamic smoothing number, the dynamic smoothing number being dependent on the current speed, the dynamic smoothing number being utilized to determine an estimated temperature of an air injection system. Some embodiments include calculating the estimated temperature of the air injection system from the dynamic smoothing number, determining whether the estimated temperature is greater than a predetermined temperature of the air injection system, and in response to determining that the estimated temperature is greater than the predetermined temperature of the air injection system, sending a signal for on-board diagnostics to resume at a next start.

20 Claims, 13 Drawing Sheets

SYSTEMS AND METHODS FOR ESTIMATING A TEMPERATURE CALIBRATION

TECHNICAL FIELD

Embodiments described herein generally relate to estimating a temperature calibration and, more specifically, to utilizing a variable smoothing number for estimating the temperature calibration.

BACKGROUND

Many national governments are now that requiring vehicles adhere to stringent emissions standards. As such, many vehicles are now designed to comply with these emissions standards and are additionally equipped with hardware and software systems for detecting when the vehicle is not in compliance with the emissions standards. While these systems generally function as designed, problems can arise with the functionality of these systems, particularly in cold temperatures.

As an example, a vehicle may be equipped with a catalytic converter that reduces emissions. The catalytic converter may additionally be coupled to an air injection system for heating the catalytic converter and thus increasing the speed and efficiency of the catalytic converter. However, in cold weather, condensation may develop and freeze on the air injection system, thereby blocking airways to the catalytic converter. Thus, the catalytic converter may not function properly because the air injection system cannot supply the air. Consequently, a vehicle computing device may incorrectly detect a malfunction in the emissions of the vehicle.

While many current solutions attempt to combat this problem by estimating a temperature calibration of the air injection system, these current solutions utilize a static smoothing number in this calculation. By using a static smoothing number, the temperature estimation is often inaccurate, causing potential problems that may not be detected.

SUMMARY

Systems and methods for estimating a temperature calibration are described. One embodiment of a method includes determining, by a computing device, a current speed of the vehicle and determining a dynamic smoothing number, the dynamic smoothing number being dependent on the current speed, the dynamic smoothing number being utilized to determine an estimated temperature of an air injection system. Some embodiments include calculating the estimated temperature of the air injection system from the dynamic smoothing number, determining whether the estimated temperature is greater than a predetermined temperature of the air injection system, and in response to determining that the estimated temperature is greater than the predetermined temperature of the air injection system, sending a signal for on-board diagnostics to resume at a next start.

In another embodiment, a system for estimating a temperature calibration includes a vehicle engine that includes an exhaust, a catalytic converter that is coupled to the exhaust of the vehicle, the catalytic converter reducing emissions of the vehicle engine, and an air injection system that is coupled to the catalytic converter, the air injection system providing air to the catalytic converter. In some embodiments the system further includes a vehicle computing device that includes a memory component that stores temperature estimation logic that, when executed by the vehicle computing device, causes the vehicle computing device to determine a vehicle coolant temperature and determine a dynamic smoothing number. In some embodiments, the dynamic smoothing number is dependent on the vehicle coolant temperature and is utilized to determine an estimated temperature of the air injection system. Additionally, in some embodiments, the temperature estimation logic further causes the vehicle computing device to calculate the estimated temperature of the air injection system from the dynamic smoothing number, determine whether the estimated temperature of the air injection system is greater than a predetermined temperature of the air injection system, and send, in response to determining that the estimated temperature of the air injection system is greater than the predetermined temperature of the air injection system, a signal for on-board diagnostics to resume at a next start.

In yet another embodiment, a vehicle includes a catalytic converter for improving emissions of the vehicle and an air injection system that is coupled to the catalytic converter via an air injection hose. The air injection system may provide air to the catalytic converter through the air injection hose, the air injection system including a heater and an air pump. Additionally, some embodiments of the vehicle includes a vehicle computing device that is coupled to the air injection system, the vehicle computing device storing a computer program that, when executed by the vehicle computing device, causes the vehicle computing device to determine a current speed of the vehicle and determine a dynamic smoothing number. The dynamic smoothing number may be dependent on the current speed and current coolant temperature, and may be utilized to determine an estimated temperature of the air injection system. Additionally, the computer program may further cause the vehicle computing device to calculate the estimated temperature of the air injection system from the dynamic smoothing number, determine whether the estimated temperature is greater than a predetermined temperature of the air injection system and, in response to determining that the estimated temperature is greater than the predetermined temperature of the air injection system, for on-board diagnostics to resume at a next start.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for estimating a temperature calibration. In some embodiments a computing device determines a current speed of the vehicle, as well as a dynamic smoothing number, the dynamic smoothing number being dependent on the current speed, the dynamic smoothing number being utilized to determine an estimated temperature of an air injection system. Some embodiments include calculating the estimated temperature of the air injection system from the dynamic smoothing number, determining whether the estimated temperature is greater than a predetermined temperature of the air injection system, and in response to determining that the estimated temperature is greater than the predetermined temperature of the air injection system, sending a signal for on-board diagnostics to resume at a next start. The systems and methods for estimating a temperature calibration and vehicles incorporating the same will be described in more detail, below.

Embodiments disclosed herein utilize a dynamic smoothing number for estimating temperature for an air injection system of a vehicle. As an example, while some systems estimate temperature of a vehicle system utilizing a static smoothing number, such systems are often inaccurate, especially at different vehicle speeds and in different environmental conditions. As such, embodiments disclosed herein are configured to determine and utilize a dynamic smoothing number that is utilized for temperature calibration of an air injection system of a vehicle, where the smoothing number depends on the current speed of the vehicle and/or a current vehicle coolant temperature.

Figure 1:
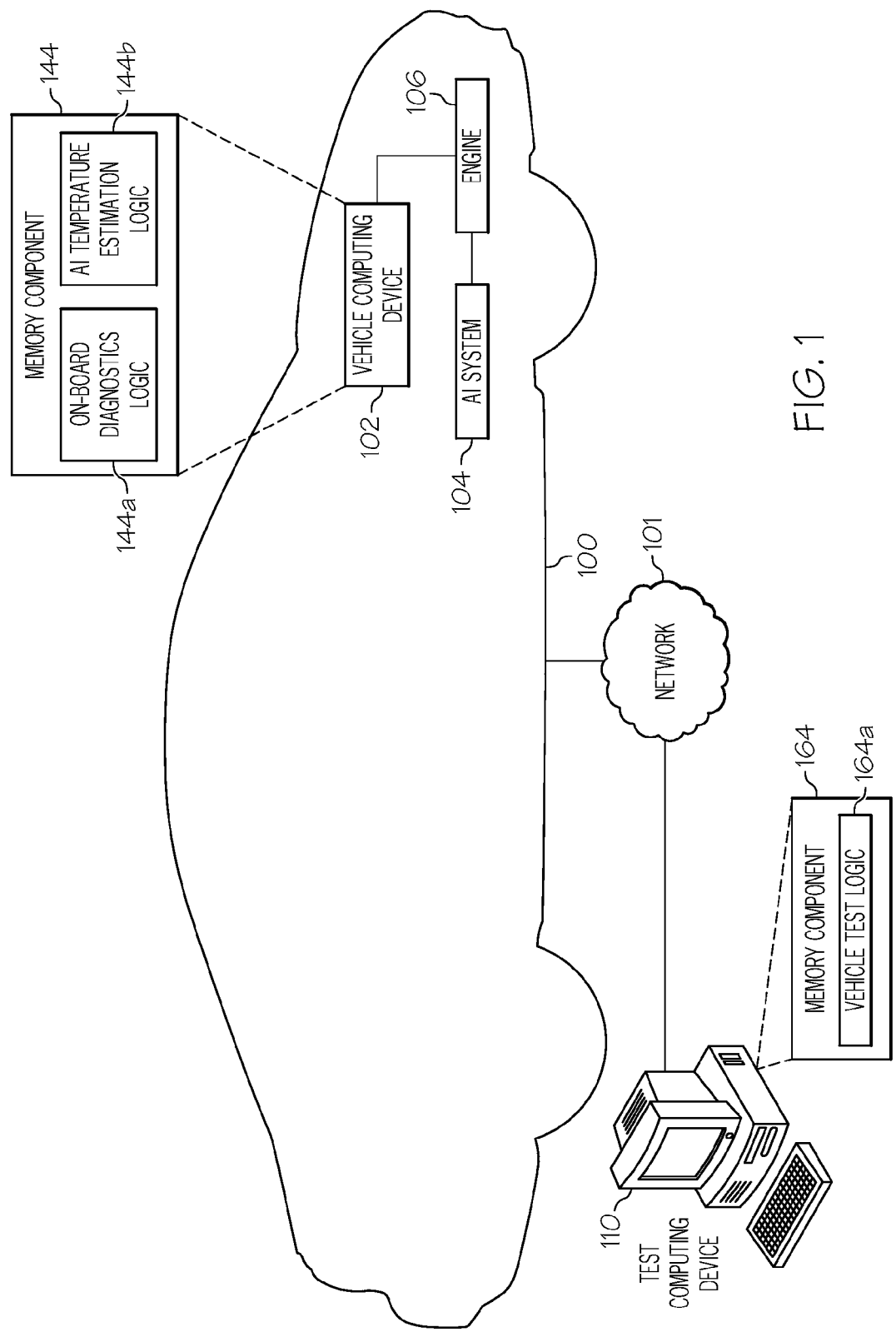
FIG. 1 schematically depicts a vehicle that includes components for estimating a temperature calibration, according to embodiments disclosed herein.

Referring now to the drawings, FIG. 1 schematically depicts a vehicle 100 that includes components for estimating a temperature calibration, according to embodiments disclosed herein. The vehicle 100 is coupled to a network 101 and includes a vehicle computing device 102, which is coupled to an air injection (AI) system 104 and a vehicle engine 106. Additionally coupled to the network is a test computing device 110. The vehicle computing device 102 includes a memory component 144, which stores an on-board diagnostics logic 144a and air injection temperature estimation logic 144b.

The vehicle 100, specifically the vehicle computing device 102, is coupled to the network 101 which, in turn, is also coupled to a test computing device 110. As described in more detail below, the test computing device 110 also includes a memory component 164 that stores vehicle test logic 164a. The test computing device 110 utilizes the vehicle test logic 164a to determine lookup tables for vehicles. The lookup tables are configured with a plurality of values of smoothing numbers for various vehicle speeds and/or coolant temperatures. With this information, the test computing device 110 can load the lookup tables onto the vehicle computing device 102 for temperature calibration.

It should be understood that while the embodiment of FIG. 1 illustrates the vehicle 100 coupled to the test computing device 110, this is merely an example. More specifically, in some embodiments, the vehicle 100 is only coupled to the test computing device 110 during a testing phase of the vehicle (via a wired and/or wireless connection). Similarly, in some embodiments, the vehicle 100 is configured for a wireless connection with the test computing device 110, such that the vehicle 100 can communicate with the test computing device 110 during and/or after the testing phase.

Figure 2:
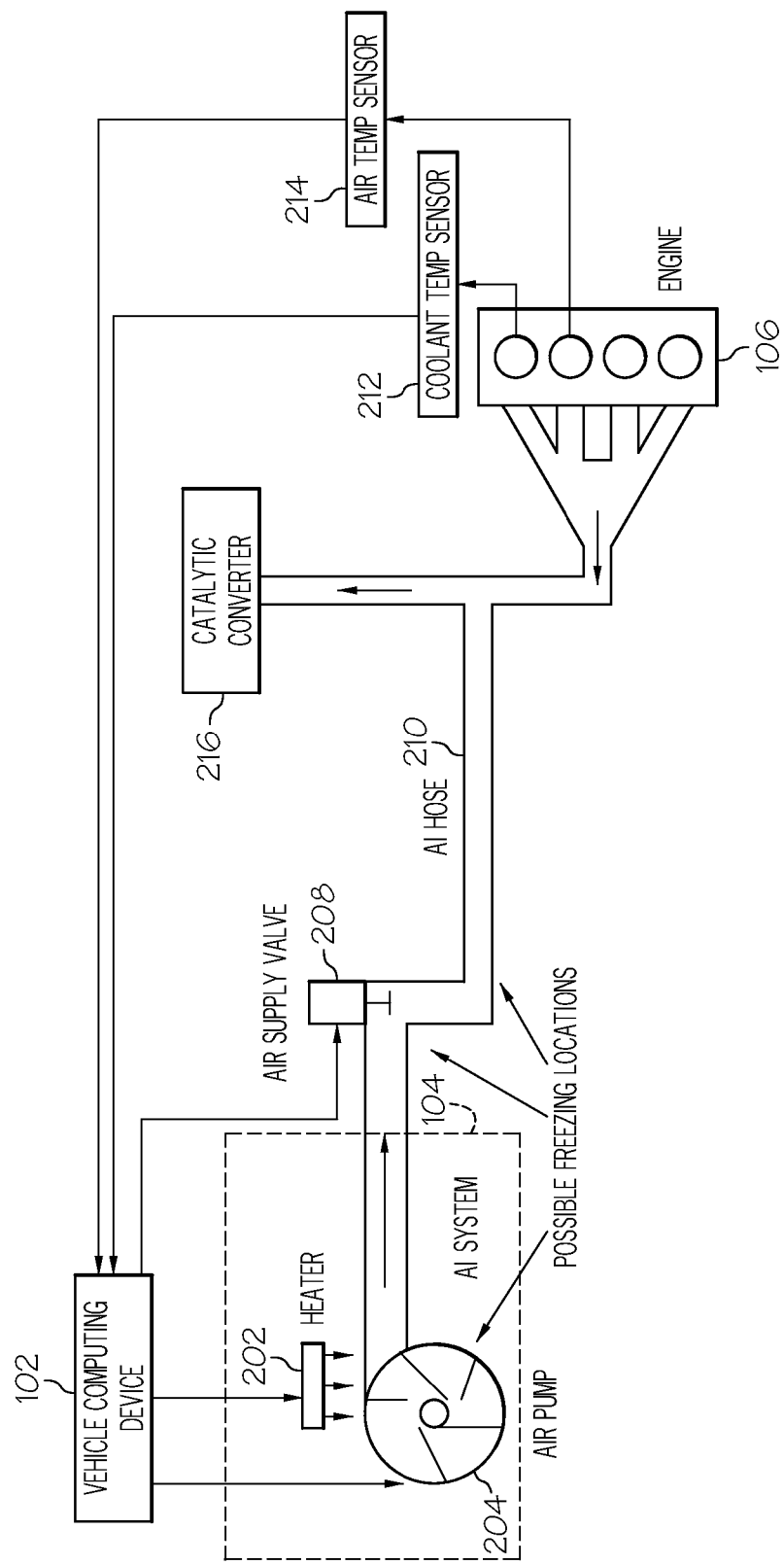
FIG. 2 schematically depicts a vehicle system, according to embodiments disclosed herein.

FIG. 2 schematically depicts components within the vehicle 100, according to embodiments disclosed herein. As illustrated, the vehicle computing device 102 is communicatively coupled to the AI system 104. The AI system includes a heater 202, such as a positive temperature coefficient (PTC) heater for providing air to the catalytic converter. Also included within the AI system 104 is an air pump 204. The vehicle engine 106 is coupled to the AI system 104 via an air supply valve 208 and an AI hose 210. Also included is a coolant temperature sensor 212, an air temperature sensor 214, and a catalytic converter 216 that are coupled to the vehicle engine 106.

Upon a driver starting the vehicle engine 106, determinations are made by the vehicle computing device 102 regarding whether the vehicle 100 is adhering to predetermined emissions standards. Generally speaking, the catalytic converter 216 is utilized by the vehicle 100 to reduce emissions from the engine. However, in cold temperatures, the catalytic converter 216 needs to warm up for proper operation to occur. Accordingly, upon engine startup, the vehicle computing device 102 may receive a current air temperature from the air temperature sensor 214. If the air temperature (e.g., the outside temperature) and/or the AI temperature are below a predetermined value (such as 0° C.), the vehicle computing device 102 can send a signal to the AI system 104 to provide air via the AI hose 210, as well as send a signal to open the air supply valve 208. Once this occurs, the vehicle computing device 102 monitors operation of the AI system 104. Upon a determination of a malfunction of the AI system 104, the vehicle computing device 102 does not send a signal indicating freezing. A fault indicator includes any of a plurality of different visual and/or audible indicators, such as a check engine light, an emissions light, an audio indicator, etc.

At low temperatures, condensation may develop in the AI system 104, such as at the air supply valve 208 and/or in the AI hose 210. At extremely low temperatures, this condensation may freeze. When this occurs, the catalytic converter 216 may not operate properly. As such, embodiments disclosed herein estimate a temperature of the AI system to determine if there is a potential for frozen condensation in the AI system and, thus, the possibility that the AI system may not operate properly.

Figure 3:
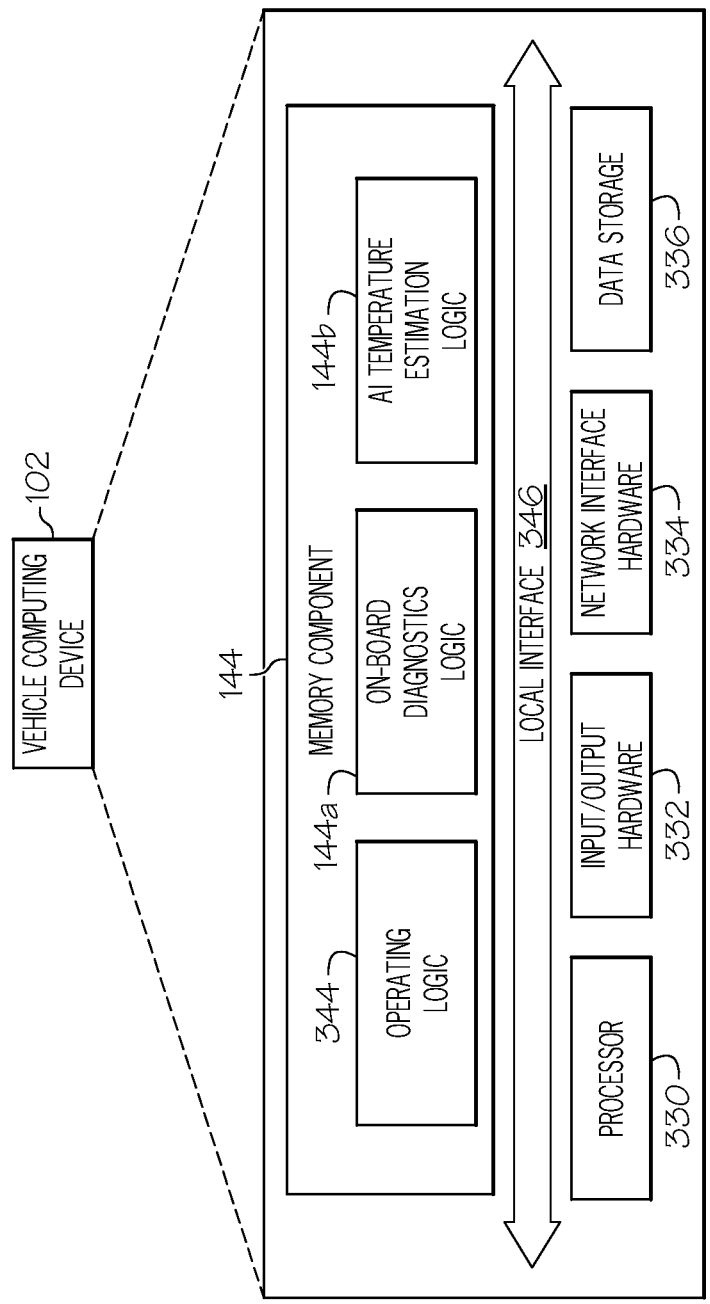
FIG. 3 schematically depicts a vehicle computing device for estimating a temperature calibration, according to embodiments disclosed herein.
Figure 4:
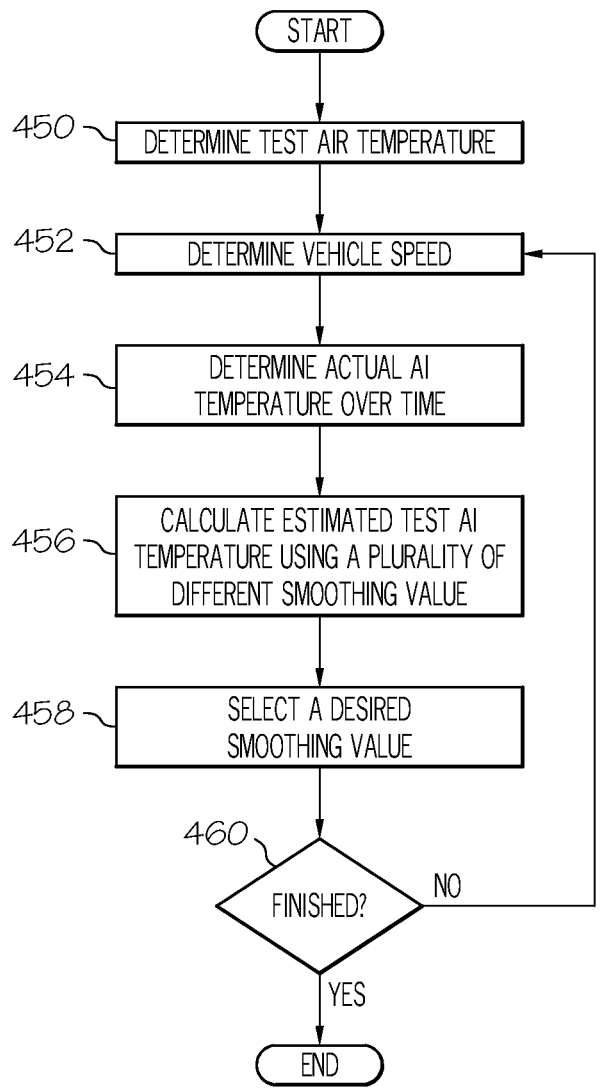
FIG. 4 depicts a flowchart for determining a dynamic smoothing value that depends on vehicle speed, according to embodiments disclosed herein.

FIG. 3 schematically depicts the vehicle computing device 102 for estimating a temperature calibration, according to embodiments disclosed herein. In the illustrated embodiment, vehicle computing device 102 includes a processor 330, input/output hardware 332, network interface hardware 334, a data storage component 336 (which may store lookup tables and/or other data), and the memory component 144. The memory component 144 is configured as volatile and/or nonvolatile memory and, as such, includes random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 102 and/or external to the vehicle computing device 102.

Additionally, the memory component 144 is configured to store operating logic 344, the on-board diagnostics logic 144a, and the AI temperature estimation logic 144b. The logic 144a, 144b include a plurality of different pieces of logic, and are embodied as a computer program, firmware, and/or hardware. A local interface 346 is also included in FIG. 3 and is implemented as a bus or other interface to facilitate communication among the components of the vehicle computing device 102.

The processor 330 includes any processing component operable to receive and execute instructions (such as from the data storage component 336 and/or memory component 144). The input/output hardware 332 includes and/or is configured to interface with a monitor, keyboard, mouse, printer, image capture device, microphone, speaker, gyroscope, compass, and/or other device for receiving, sending, and/or presenting data. The network interface hardware 334 includes and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication is facilitated between the vehicle computing device 102 and other computing devices (such as test computing device 110). Similarly, it should be understood that the data storage component 336 resides local to and/or remote from the vehicle computing device 102 and is configured to store one or more pieces of data for access by the vehicle computing device 102 and/or other components.

Included in the memory component 144 are the operating logic 344, the on-board diagnostics logic 144a, and the AI temperature estimation logic 144b. The operating logic 242 includes an operating system and/or other software for managing components of the vehicle computing device 102. Similarly, as discussed above, the AI temperature estimation logic 144b resides in the memory component 144 and is configured to cause the vehicle computing device 102 to estimate a temperature of the AI system 104. Other functionality is also included and described in more detail, below. Similarly, the on-board diagnostics logic 144a is configured to cause the vehicle computing device 102 to perform other vehicle monitoring and/or diagnostics.

It should be understood that the components illustrated in FIG. 3 are merely exemplary and are not intended to limit the scope of this disclosure. While the components in FIG. 3 are illustrated as residing within the vehicle computing device 102, this is merely an example. In some embodiments, one or more of the components may reside external to the vehicle computing device 102. It should also be understood that, while the vehicle computing device 102 in FIGS. 1 and 2 is illustrated as a single device, this is also merely an example. In some embodiments, the AI temperature estimation functionality and the on-board diagnostics functionality may reside on different devices.

Additionally, while the vehicle computing device 102 is illustrated with the on-board diagnostics logic 144a and the AI temperature estimation logic 144b, this is also an example. More specifically, in some embodiments, a single piece of logic may perform the described functionality. Similarly, in some embodiments, this functionality is distributed to a plurality of different pieces of logic, which may reside in the vehicle computing device 102 and/or elsewhere. Additionally, while only three applications are illustrated as being stored by the memory component 144, other applications may also be stored in the memory component 144 and utilized by the vehicle computing device 102. It should also be noted that although, the vehicle computing device 102 is described with regard to FIG. 3, this is merely an example. More specifically, similar components may be included in the test computing device 110 (FIG. 1), which includes the vehicle test logic 164a.

Referring now to FIGS. 1, 2, 4, and 5, FIG. 4 depicts a flowchart for determining a dynamic smoothing value that depends on vehicle speed, according to embodiments disclosed herein. As an example, during a testing phase of the vehicle 100, one or more tests may be performed to determine values for the dynamic smoothing value. Accordingly, as illustrated in block 450, a test air temperature is determined by the test computing device 110. Similarly, at block 452, a test vehicle speed is determined by the test computing device 110. At block 454, the test computing device 110 determines an actual temperature of the AI system 104 over time, while the vehicle 100 maintains a constant vehicle speed. More specifically, during this testing phase of the vehicle 100, a test temperature sensor may be coupled to the AI system (which is not present after testing is complete). The test temperature sensor may send temperature readings to the test computing device 110 for determining a desired smoothing value for a particular speed and/or coolant temperature.

At block 456, an estimated test AI temperature is calculated using a plurality of different smoothing values. More specifically, as described in more detail below (with reference to FIG. 5), the actual AI temperature may be determined from the test temperature sensor and plotted. Additionally, the test computing device 110 can calculate an estimated test AI temperature, using a plurality of different smoothing values in the equation $T(i)=T(i-1)+(T(i-1)-Tout)/nsm$, where $T(i)$ represents the AI temperature of the current iteration (i); $T(i-1)$ represents the AI temperature of the previous iteration; Tout represents the outside temperature; and nsm represents the smoothing number. Once calculated, the estimated test AI temperature may be compared to the actual test AI temperature to determine the closest match. The smoothing value for the closest match may be determined as the desired smoothing value for that particular vehicle speed. In block 458, a desired smoothing value can be selected for the smoothing number. At block 460, a determination can be made regarding whether all desired vehicle test speeds have been tested. If not, the process may return to block 452 to determine the next vehicle test speed. If so, the process may end.

Figure 5:
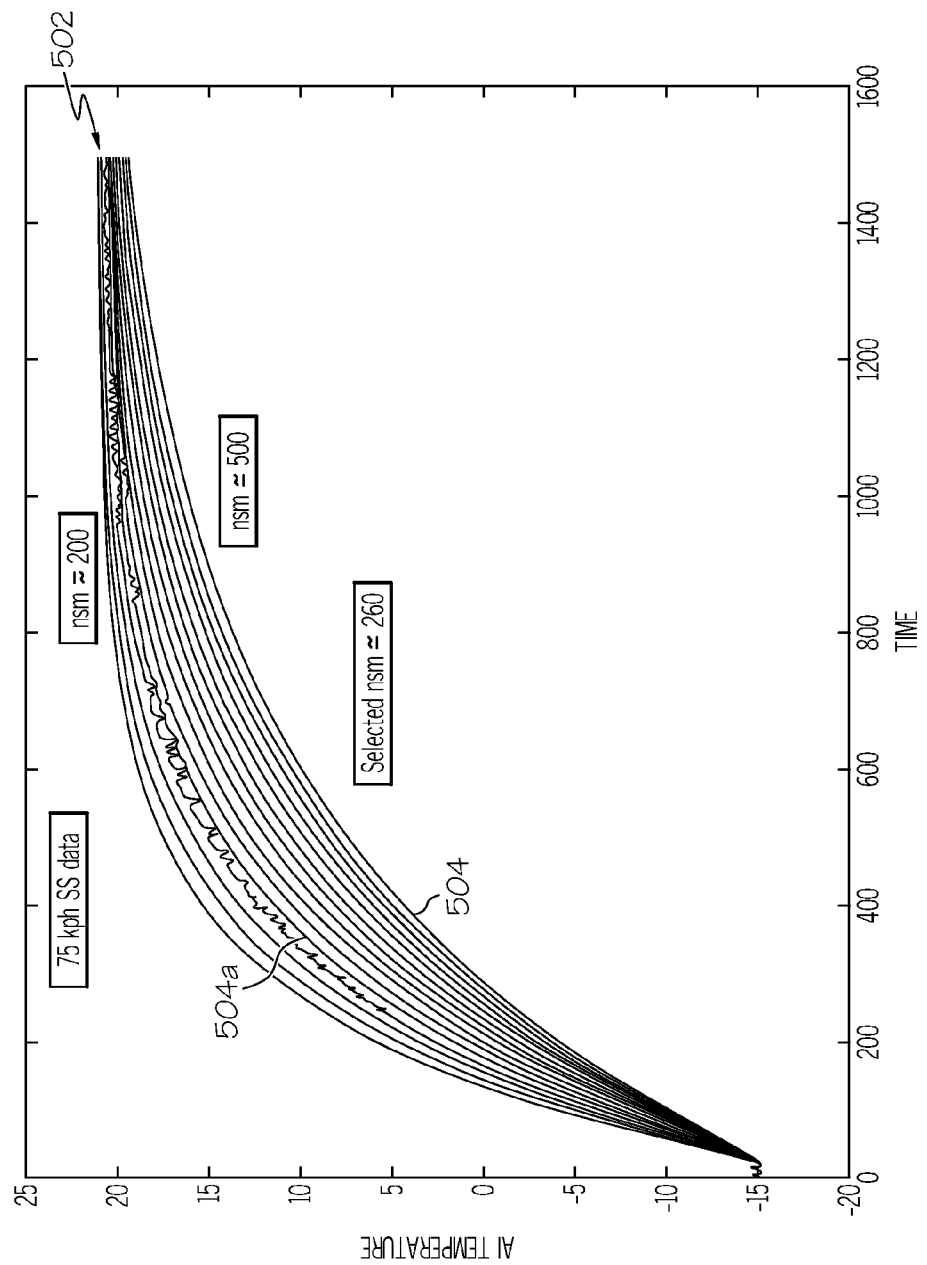
FIG. 5 depicts a graphical representation of a plurality of temperature calibrations, utilizing a plurality of different smoothing values, according to various embodiments disclosed herein.

FIG. 5 depicts a graphical representation of a plurality of temperature calibrations, utilizing a plurality of different smoothing values, according to various embodiments disclosed herein. As illustrated, for a single test vehicle speed (75 kilometers per hour), an actual test AI temperature plot 502 is determined (represented in FIG. 5 as the jagged line). Additionally, as discussed above with regard to FIG. 4, a plurality of different smoothing numbers may be utilized and inserted into the equation above, to determine test plots 504. In the example from FIG. 5, the test plots 504 have smoothing values that range from 200 to 500. From this data, a technician and/or the test computing device 110 compares the plurality of test plots 504 with the actual test AI temperature plot 502 to determine a desired test plot 504a. The desired test plot 504a may be the closest plot to the actual test AI temperature plot 502, without exceeding the actual test AI temperature plot. From the desired test plot 504a, a desired smoothing value for this vehicle test speed may be determined (in this example the desired smoothing value is 260). Additionally, the test computing device 110 can store the desired smoothing value in a lookup table that is indexed by vehicle speed. Similar data is determined for other vehicle test speeds to determine smoothing values for those other speeds.

Figure 6:
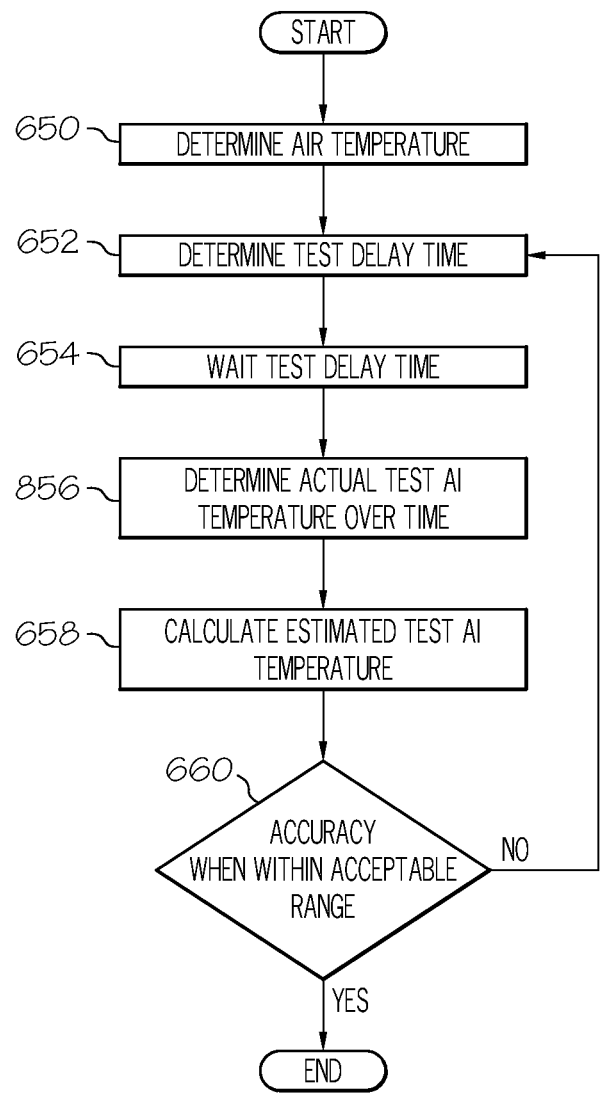
FIG. 6 depicts a flowchart for determining a delay for estimating a temperature calibration, according to embodiments disclosed herein.

Referring now to FIG. 6, as will be understood, due to various vehicle startup procedures that are performed in the vehicle 100, the actual test temperature may differ greatly from the estimated test temperature for an amount of time after startup. As such, the process of FIG. 6 determines the amount of delay to utilize before determining estimated AI temperature. By delaying the first temperature estimation until the estimated temperature can stabilize, false temperature estimations can be reduced.

More specifically, FIG. 6 depicts a flowchart for determining a delay for estimating a temperature calibration, according to embodiments disclosed herein. As illustrated in block 650, the test computing device 110 determines an air temperature, such as from the air temperature sensor 214 (FIG. 2). At block 652, a test delay time for calculating the AI temperature is determined. More specifically, similar to the example described with reference to FIGS. 4 and 5, the actual test AI temperature may be compared with an estimated test AI temperature and a smoothing value may be selected. However, in many embodiments, the example of FIG. 5 may also show that there is a time after startup where even the most accurate estimated test AI temperature is inaccurate. While this estimated test AI temperature may eventually gain the desired accuracy, the initial startup inaccuracy may cause an issue. Accordingly, a delay in determining the estimated AI temperature may reduce this inaccuracy. As such, a test delay time may be determined.

At block 654, the test computing device 110 waits the test delay time. At block 656, after the delay time has expired, the test computing device 110 determines an actual AI test temperature over time, via a test temperature sensor. At block 658 the test computing device 110 calculates an estimated test AI temperature over time. The data from blocks 656 and 658 can be compared to determine whether the estimated test AI temperature is a close estimation of the actual test AI temperature. At block 660, a determination can be made regarding whether the test delay time provides the desired accuracy. If not, the process returns to block 652 to determine a different delay time. If the accuracy is acceptable, the process ends.

Figure 7:
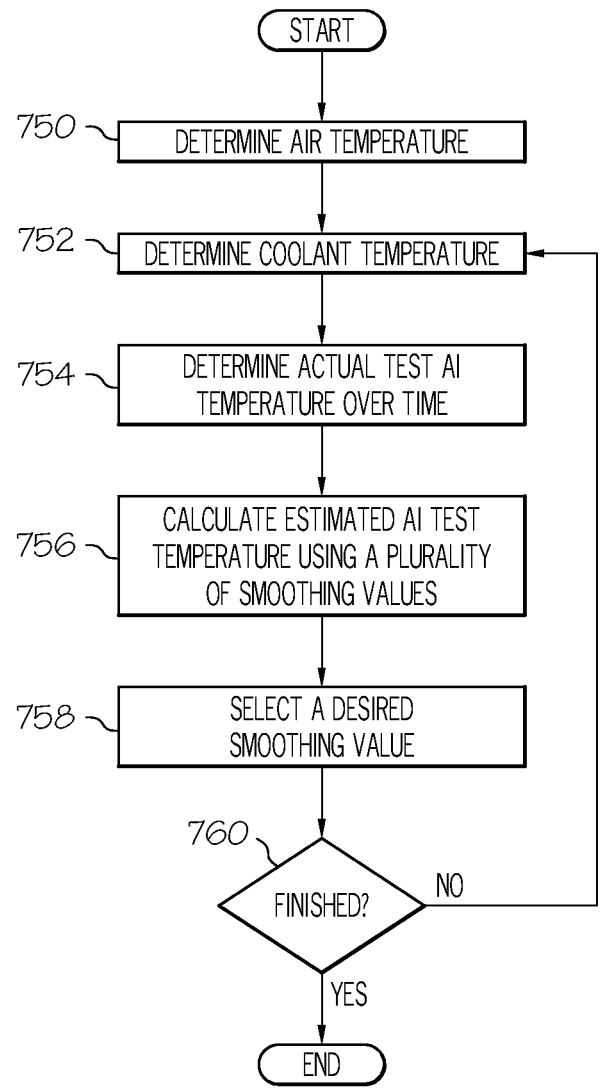
FIG. 7 depicts a flowchart for determining a dynamic smoothing value that depends on coolant temperature, according to embodiments disclosed herein.

FIG. 7 depicts a flowchart for determining a dynamic smoothing value that depends on coolant temperature, according to embodiments disclosed herein. As illustrated in block 750, the test computing device 110 determines an air temperature. At block 752 a test vehicle coolant temperature is also determined, such as by the coolant temperature sensor 212 (FIG. 2). Similar to the example from FIG. 4, smoothing values may be determined utilizing an iterative optimization process.

Additionally, at block 754, the test computing device 110 determines an actual AI test temperature over time. At block 756, the test computing device 110 calculates an estimated AI test temperature using a plurality of smoothing values for the smoothing number. At block 758, a desired smoothing value is selected from the plurality of smoothing values. This desired smoothing value is stored in a lookup table and indexed according to the coolant temperature. At block 760, a determination is made regarding whether the desired smoothing values have been determined. If not, the process returns to block 752 to determine a new coolant temperature. If so, the process ends.

Figure 8:
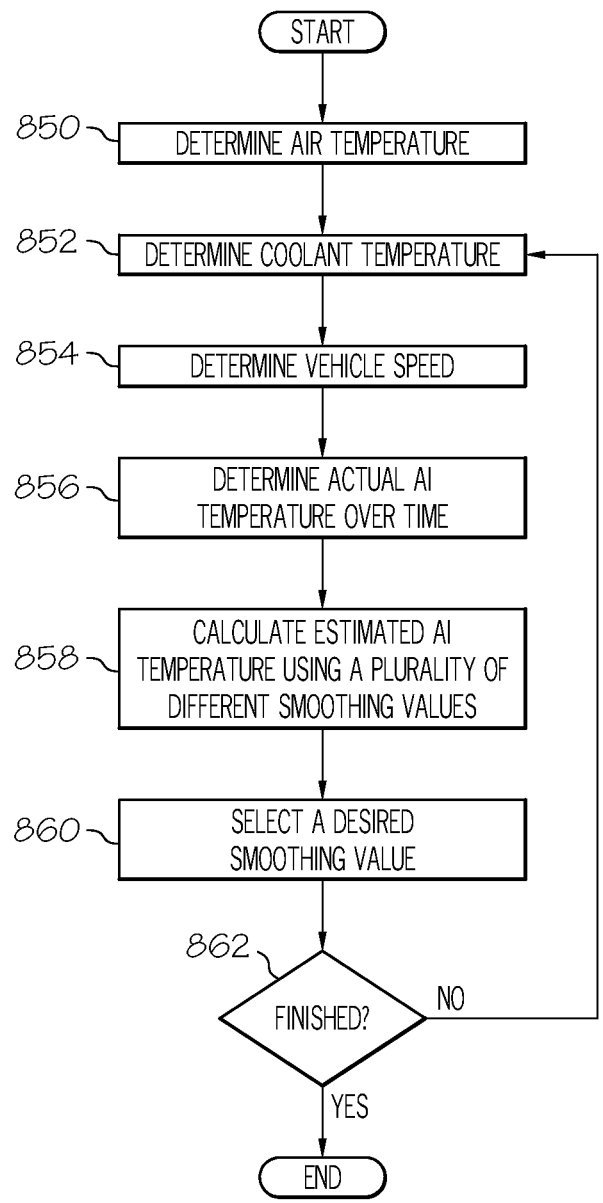
FIG. 8 depicts a flowchart for determining a dynamic smoothing value that depends from vehicle speed and coolant temperature, according to embodiments disclosed herein.

FIG. 8 depicts a flowchart for determining a dynamic smoothing value that depends from vehicle speed and coolant temperature, according to embodiments disclosed herein. As illustrated in block 850, an air temperature is determined, such as by the air temperature sensor 214. At block 852, a vehicle coolant temperature is determined, such as by the coolant temperature sensor 212. At block 854, a vehicle speed is determined. At block 856, the test computing device 110 determines an actual test temperature over time, such as via a test temperature sensor. At block 858 an estimated test temperature is calculated using a plurality of different smoothing values (similar to those from FIG. 5). At block 860, a desired smoothing value is determined from the plurality of smoothing values. At block 862, a determination can be made regarding whether the smoothing values for the desired vehicle speeds and coolant temperatures have been determined. If not, the process returns to block 852. If the smoothing values for the desired vehicle speeds and coolant temperatures have been determined, the process ends.

Figure 9:
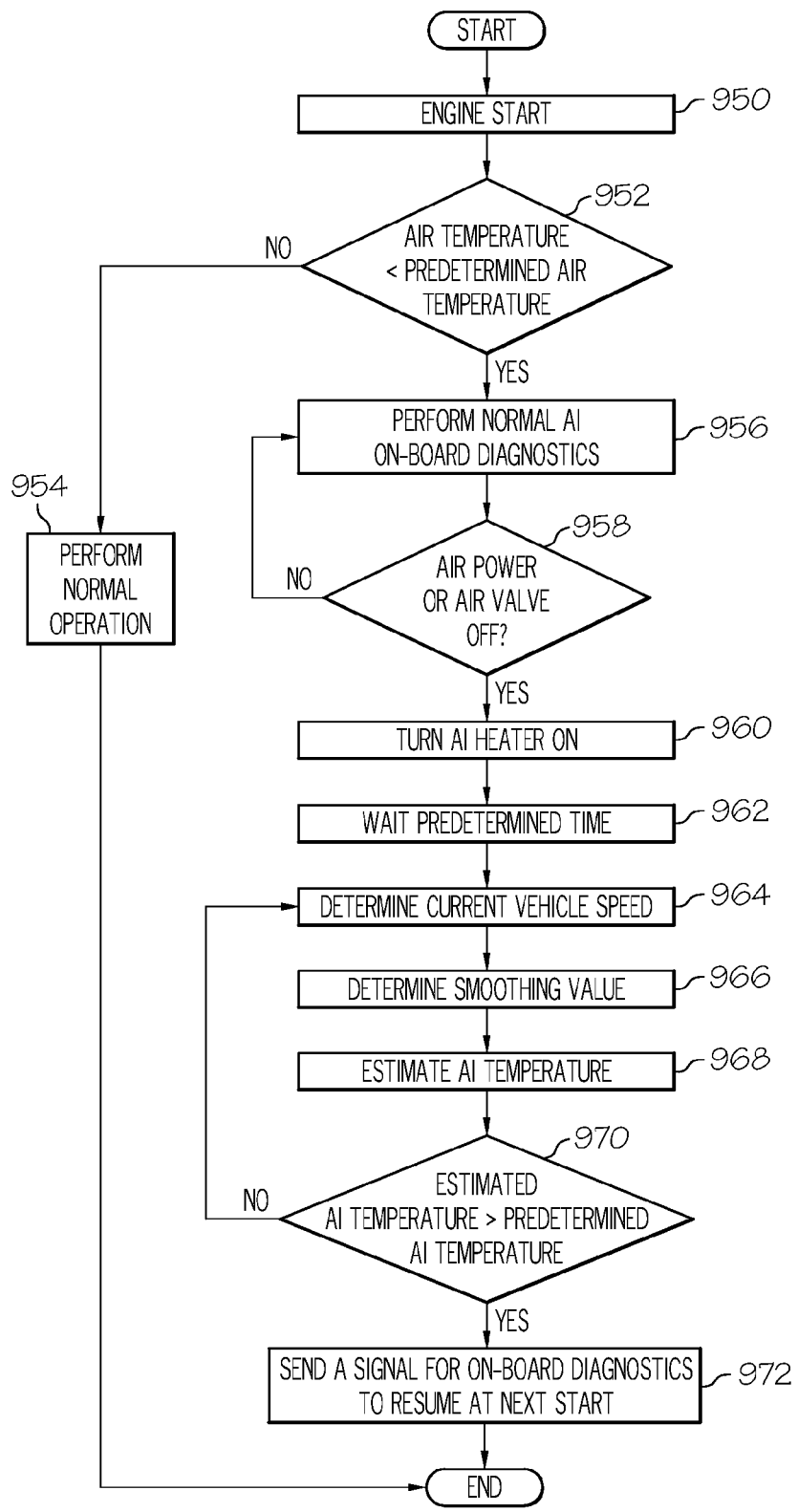
FIG. 9 depicts a flowchart for estimating a temperature calibration, utilizing a dynamic smoothing value that depends from vehicle speed, according to embodiments disclosed herein.

FIG. 9 depicts a flowchart for estimating a temperature calibration, utilizing a dynamic smoothing value that depends on the vehicle speed, according to embodiments disclosed herein. As illustrated in block 950, the vehicle computing device 102 determines that the engine has started. At block 952, the vehicle computing device 102 determines whether the air temperature is less than a predetermined air temperature. If not, at block 954, the vehicle computing device 102 performs a normal startup operation and the process ends. If the current air temperature is less than the predetermined air temperature, at block 956, the vehicle computing device 102 performs normal on-board diagnostics. At block 958, the vehicle computing device 102 determines whether air power at the air pump 204 or the air supply valve 208 is off. If not, the process returns to block 958. If so however, at block 960, the vehicle computing device 102 activates the AI heater 202.

At block 962, the vehicle computing device 102 waits a predetermined delay time (as determined from FIG. 6). At block 964, the vehicle computing device 102 determines a current vehicle speed. At block 966, the vehicle computing device 102 determines a smoothing value for the current vehicle speed. The smoothing value is accessed from a lookup table, such as the lookup table using the methodologies outlined in FIGS. 4 and 5. At block 968, the vehicle computing device 102 utilizes the determined smoothing value to estimate the AI temperature. As described above, the AI temperature is calculated from the equation $T(i)=T(i-1)+(T(i-1)-Tout)/nsm$ or other similar equation. At block 970, the vehicle computing device 102 determines whether the estimated AI temperature is greater than a predetermined AI temperature. If so, at block 972, the vehicle computing device 102 sends a signal for on-board diagnostics to resume at the next start. If not however, the process returns to block 964.

Figure 10:
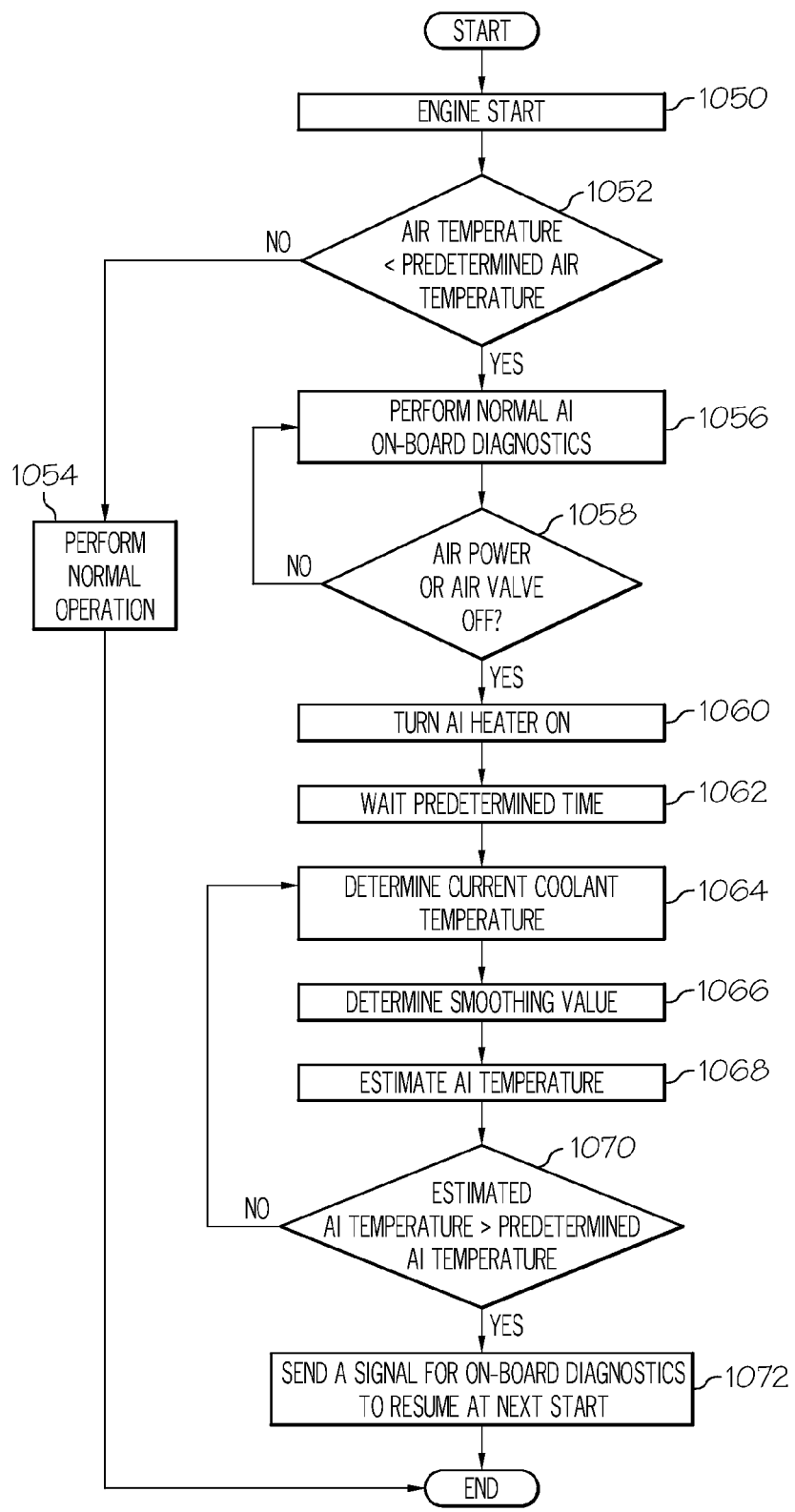
FIG. 10 depicts a flowchart for estimating a temperature calibration, utilizing a dynamic smoothing value that depends from coolant temperature, according to embodiments disclosed herein.

FIG. 10 depicts a flowchart for estimating a temperature calibration, utilizing a dynamic smoothing value that depends on the coolant temperature, according to embodiments disclosed herein. As illustrated in block 1050, the vehicle computing device 102 determines whether the vehicle engine 106 has started. At block 1052, the vehicle computing device 102 determines whether the air temperature is less than a predetermined air temperature. If the air temperature is not less than the predetermined air temperature, at block 1054, normal operation is implemented. If the air temperature is less than the predetermined air temperature, at block 1056, normal AI on-board diagnostics is performed. At block 1058 a determination is made regarding whether air power to the air pump 204 and/or the air supply valve 208 is off. If these components are on, the process returns to block 1056. If these components are off, at block 1060, the vehicle computing device 102 turns on the AI heater 202. At block 1062, the vehicle computing device 102 waits a predetermined delay time (as determined in FIG. 6). At block 1064 the vehicle computing device 102 determines a current coolant temperature. At block 1066 a dynamic smoothing value is determined, such as from the lookup table determined with the methodology outlined in FIG. 7. At block 1068, based on the dynamic smoothing value, the vehicle computing device 102 estimates AI temperature. At block 1070, the vehicle computing device 102 determines whether the estimated AI temperature is greater than a predetermined AI temperature. If not, the process returns to block 1064. If so, the vehicle computing device 102 sends a signal for on-board diagnostics to resume at the next start.

Figure 11:
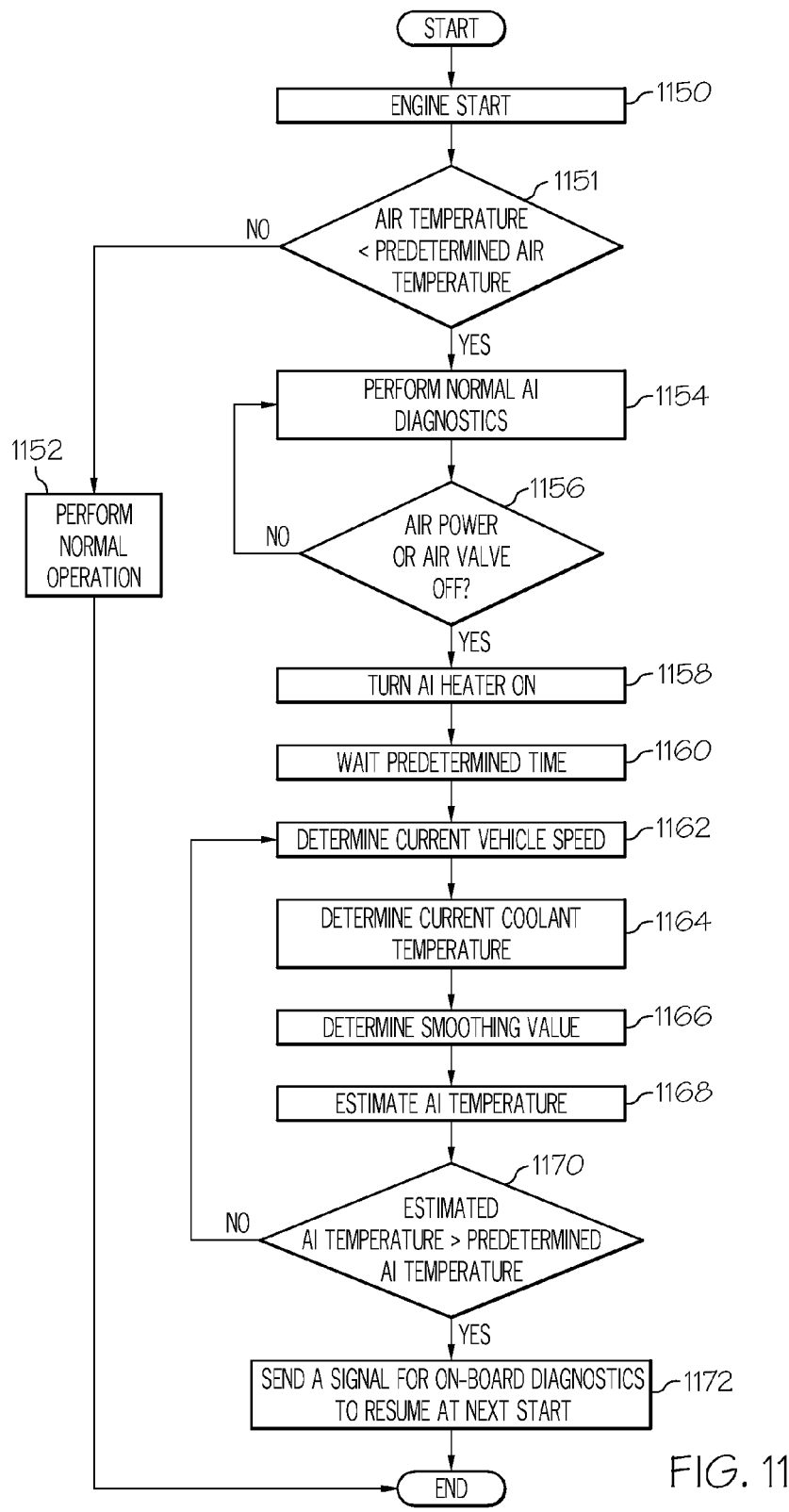
FIG. 11 depicts a flowchart for estimating a temperature calibration, utilizing a dynamic smoothing value that depends from vehicle speed and coolant temperature, according to embodiments disclosed herein.

FIG. 11 depicts a flowchart for estimating a temperature calibration, utilizing a dynamic smoothing value that depends from vehicle speed and coolant temperature, according to embodiments disclosed herein. As illustrated in block 1150, the vehicle computing device 102 determines an engine start. At block 1151, the vehicle computing device 102 determines whether air temperature is less than a predetermined air temperature. If not, at block 1152, normal operation commences. If the air temperature is less than the predetermined air temperature, at block 1154, the vehicle computing device 102 performs normal AI diagnostics. At block 1156, the vehicle computing device 102 determines whether air power at the air pump 204 or the air supply valve 208 of the AI system 104 are not operating. If they are operating, the process returns to block 1154. If the air pump 204 and/or air supply valve 208 are not operating properly, the vehicle computing device 102 activates the AI heater 202. At block 1160, the vehicle computing device 102 then waits a predetermined delay time (as determined in the process from FIG. 6). At block 1162, the vehicle computing device 102 determines current vehicle speed. At block 1164, the vehicle computing device 102 determines a current coolant temperature. At block 1166, the vehicle computing device 102 determines a smoothing value associated with the current vehicle speed and the current coolant temperature. As discussed above, this smoothing value is available in a lookup table, as determined from the methodologies from FIG. 8. At block 1168, the vehicle computing device 102 estimates AI temperature. At block 1170, the vehicle computing device 102 determines whether the estimated AI temperature is less than predetermined AI temperature. If not, the process may return to block 1162. If the estimated AI temperature is greater than the predetermined AI temperature, the vehicle computing device 102 sends a signal for on-board diagnostics to resume at the next start.

Figure 12A:
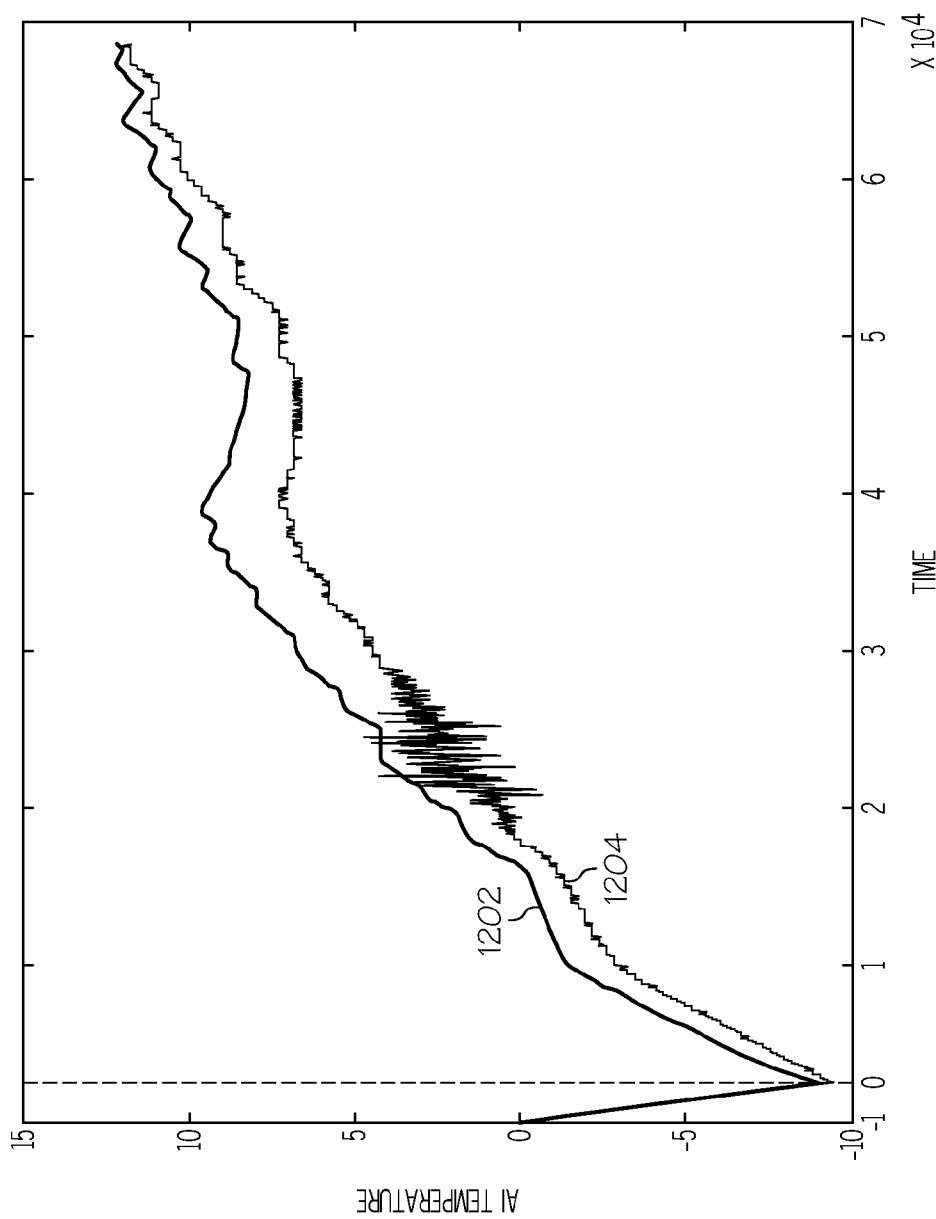
FIGS. 12A and 12B depict graphical representations of a plurality of scenarios in predicting a temperature calibration, while utilizing a dynamic smoothing value, according to embodiments disclosed herein.
Figure 12B:
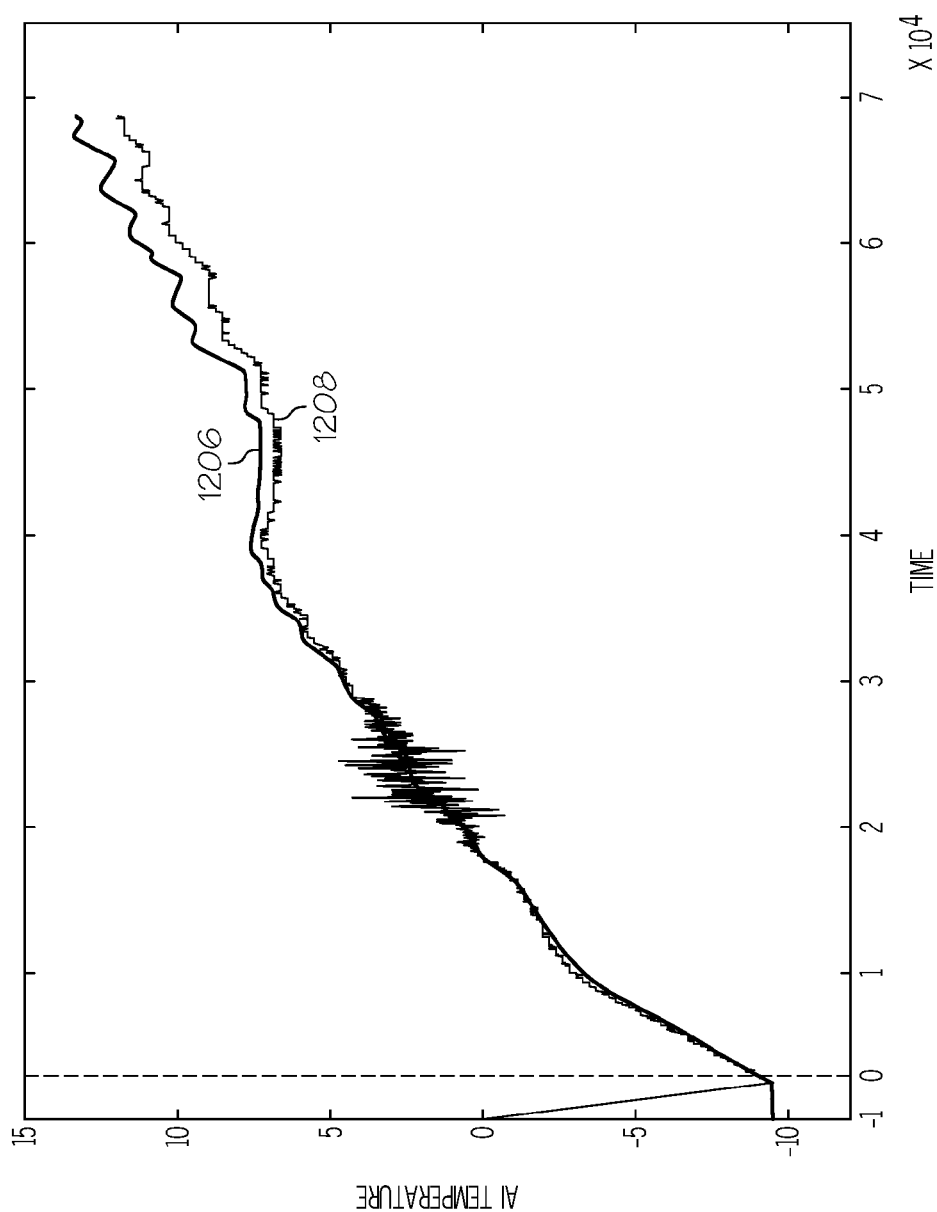

FIGS. 12A and 12B depict graphical representations of a plurality of scenarios in predicting a temperature calibration, while utilizing a dynamic smoothing value, according to embodiments disclosed herein. As illustrated in FIG. 12A, through use of the process from FIG. 9, the results of determining the estimated test AI temperature 1204 match closely with the actual test AI temperature 1202. Additionally, the estimated test AI temperature 1204 is determined in a manner to prevent the estimated test AI temperature 1204 from ever being greater than the actual AI test temperature 1202. This prevents situations where the vehicle 100 is experiencing a temperature malfunction (e.g., freezing), but the vehicle computing device is not recognizing the temperature malfunction. Further, as illustrated in FIG. 12A, the estimation of AI temperature began at time=0, while the engine started at time=−1. This signifies the delay that is implemented as described in FIG. 6. Thus, the inaccuracies that may occur shortly after startup do not affect the AI temperature estimation Similarly, the example of FIG. 12B illustrates results that are achieved when the estimated test AI temperature 1208 is determined utilizing a dynamic smoothing value that is derived from both vehicle speed and coolant temperature, as described in reference to FIG. 11. As illustrated in this example, the estimated AI temperature is even closer to the actual test AI temperature 1206 than in the previous example and the estimated AI temperature 1208 is not ever greater than the actual test AI temperature 1206.

As illustrated above, various embodiments of utilizing a dynamic smoothing value to perform a temperature calibration of an air injection system are disclosed. Utilization of a dynamic smoothing value can more accurately estimate a temperature of an air injection system by utilizing vehicle speed and/or coolant temperature. Additionally, by delaying a start time for beginning the temperature estimation, additional accuracy may be achieved.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for estimating a temperature calibration. As discussed above, such embodiments are configured to determine a dynamic smoothing value, which may be based on vehicle speed, coolant temperature, and/or other criteria. It should also be understood that these embodiments are merely exemplary and are not intended to limit the scope of this disclosure.

What is claimed is:

1. A method for estimating a temperature calibration of a vehicle, the method comprising:
   determining, by a computing device, a current speed of the vehicle;
   determining a dynamic smoothing number, the dynamic smoothing number being dependent on the current speed;
   calculating an estimated temperature of an air injection system from the dynamic smoothing number;
   determining whether the estimated temperature is greater than a predetermined temperature of the air injection system; and
   in response to determining that the estimated temperature is greater than the predetermined temperature of the air injection system, sending a signal for on-board diagnostics to resume at a next start.

2. The method of claim 1, further comprising waiting a predetermined delay time before calculating the estimated temperature of the air injection system.

3. The method of claim 1, further comprising determining a vehicle coolant temperature, wherein the dynamic smoothing number is additionally dependent on the vehicle coolant temperature.

4. The method of claim 1, further comprising determining whether at least one of: an air pump of the air injection system and an air supply valve associated with the air injection system is operating prior to determining the current speed of the vehicle.

5. The method of claim 1, wherein the dynamic smoothing number is determined from a lookup table that includes a plurality of values for the dynamic smoothing number, the lookup table being created by a test computing device that determines the plurality of values, wherein determining the plurality of values includes at least the following performed during a testing phase of the vehicle:
determining a test speed of the vehicle;
determining, from a test temperature sensor, an actual temperature of the air injection system;
calculating an estimated test temperature of the air injection system using a plurality of different smoothing values; and
selecting a desired smoothing value for the test speed of the vehicle based on a matching of the estimated test temperature of the air injection system and the actual temperature of the air injection system.

6. The method of claim 1, further comprising determining a predetermined delay time to wait before calculating the estimated temperature of the air injection system.

7. The method of claim 1, wherein calculating the estimated temperature of the air injection system includes accessing a lookup table.

8. A system for estimating a temperature calibration of a vehicle, the system comprising:
a vehicle engine that comprises an exhaust;
a catalytic converter that is coupled to the exhaust of the vehicle, the catalytic converter reducing emissions of the vehicle engine;
an air injection system that is coupled to the catalytic converter, the air injection system providing air to the catalytic converter; and
a vehicle computing device comprising a memory component that stores temperature estimation logic that, when executed by the vehicle computing device, causes the vehicle computing device to perform at least the following:
determine a vehicle coolant temperature;
determine a dynamic smoothing number, the dynamic smoothing number being dependent on the vehicle coolant temperature, the dynamic smoothing number being utilized to determine an estimated temperature of the air injection system;
calculate the estimated temperature of the air injection system from the dynamic smoothing number;
determine whether the estimated temperature of the air injection system is greater than a predetermined temperature of the air injection system; and
send, in response to determining that the estimated temperature of the air injection system is greater than the predetermined temperature of the air injection system, a signal for on-board diagnostics to resume at a next start.

9. The system of claim 8, wherein the temperature estimation logic further causes the vehicle computing device to wait a predetermined delay time before calculating the estimated temperature of the air injection system.

10. The system of claim 9, wherein the predetermined delay time is determined by a test computing device during a testing phase of the vehicle.

11. The system of claim 8, wherein the dynamic smoothing number is additionally dependent on a current speed of the vehicle.

12. The system of claim 8, wherein the temperature estimation logic further causes the vehicle computing device to determine whether at least one of: an air pump of the air injection system and an air supply valve associated with the air injection system is operating prior to determining the vehicle coolant temperature.

13. The system of claim 8, wherein the dynamic smoothing number is determined from a lookup table that includes a plurality of values for the dynamic smoothing number, the lookup table being created by a test computing device that determines the plurality of values, wherein determining the plurality of values includes at least the following performed during a testing phase of the vehicle:
determining a test vehicle coolant temperature;
determining, from a test temperature sensor, an actual temperature of the air injection system;
calculating an estimated test temperature of the air injection system using a plurality of different smoothing values; and
selecting a desired smoothing value for the test vehicle coolant temperature, based on a matching of the estimated test temperature of the air injection system and the actual temperature of the air injection system.

14. The system of claim 8, wherein the temperature estimation logic further causes the vehicle computing device to determine whether a current air temperature is less than a predetermined air temperature.

15. A vehicle comprising:
a catalytic converter for improving emissions of the vehicle;
an air injection system that is coupled to the catalytic converter via an air injection hose, the air injection system for providing air to the catalytic converter through the air injection hose, the air injection system comprising a heater and an air pump; and
a vehicle computing device that is coupled to the air injection system, the vehicle computing device storing a computer program that, when executed by the vehicle computing device, causes the vehicle computing device to perform at least the following:
determine a current speed of the vehicle;
determine a dynamic smoothing number, the dynamic smoothing number being dependent on the current speed and current coolant temperature, the dynamic smoothing number being utilized to determine an estimated temperature of the air injection system;
calculate the estimated temperature of the air injection system from the dynamic smoothing number;
determine whether the estimated temperature is greater than a predetermined temperature of the air injection system; and
in response to determining that the estimated temperature is greater than the predetermined temperature of the air injection system, send a signal for on-board diagnostics to resume at a next start.

16. The vehicle of claim 15, the computer program further causing the vehicle computing device to wait a predetermined delay time before calculating the estimated temperature of the air injection system.

17. The vehicle of claim 16, wherein the predetermined delay time is determined by a test computing device during a testing phase of the vehicle.

18. The vehicle of claim 15, the computer program further causing the vehicle computing device to determine whether at least one of the following is operating prior to determining the current speed of the vehicle: the air pump of the air injection system and an air supply valve associated with the air injection system.

19. The vehicle of claim 15, wherein the dynamic smoothing number is determined from a lookup table that includes a plurality of values for the dynamic smoothing number, the lookup table being created by a test computing device that determines the plurality of values, wherein determining the plurality of values includes at least the following performed during a testing phase of the vehicle:
- determining a test vehicle coolant temperature;
- determining a test speed of the vehicle;
- determining, from a test temperature sensor, an actual temperature of the air injection system;
- calculate an estimated test temperature of the air injection system using a plurality of different smoothing values; and
- selecting a desired smoothing value for the test vehicle coolant temperature and the test speed of the vehicle, based on a matching of the estimated test temperature of the air injection system and the actual temperature of the air injection system.

20. The vehicle of claim 15, wherein the computer program further causes the vehicle computing device to determine whether a current air temperature is less than a predetermined air temperature.

* * * * *